United States Patent Office 3,347,236
Patented Oct. 17, 1967

3,347,236
DISPOSABLE ARTICLE HAVING A LAYER OF ARTIFICIAL ABSORBENT FIBERS AND SUPPORTING SHEET
David Torr, Ripley Lane, Oyster Bay, N.Y. 11771
No Drawing. Filed Dec. 2, 1963, Ser. No. 327,487
5 Claims. (Cl. 128—284)

The present invention relates to a novel mono-layer product and to an improved multi-layer, toilet-water-flush-awayable napkin such as a disposable diaper, a pad for protecting the bed against wetting, or a catamenial device such as a sanitary napkin or a vaginal tampon, as well as for surgical and various medical applications and the like.

U.S. Patent No. 3,070,095, issued to the present applicant on Dec. 25, 1962, covers a novel multi-layer product which overcomes the disadvantages of such products previously proposed and combines a high degree of absorption with thin, soft and flexible characteristics, thereby avoiding discomfort or irritation by abrasion in its use. In addition, the patented products are so composed that they can be readily and completely flushed away by a toilet water stream.

The patent multi-layer, disposable product has three components: (1) a body-touching sheet or ply having an exposed surface which contacts the wearer's body, (2) the water-impervious sheet and (3) an intermediate layer of discrete particles in from finely divided to flake form of a dry, water-absorbent substance that in moist or wet state is harmless to the surface of the body contacted by the product.

The intermediate layer is the principal water-absorbent portion of the patented product. The discrete particles are preferably dry water-absorbent substances of other than cellulosic origin, which in the moist or wet state are harmless to the surface of the body contacted by them and inert to any other constituent of the multi-ply product contacted by them. The water-absorbent particles are generally organic in nature and can be of natural or synthetic origin. It is further disclosed that the finely divided particles are most advantageously between about two hundred and four hundred mesh size. The disclosed water-absorbent or moisture-absorbent substance can be any one or a mixture of a wide variety of dry solid substances of other than cellulose origin, provided it is harmless and inert to the body of the wearer and to the cellulose-type sheets employed in making up the multi-ply product. Among such water-absorbent substances are organic substances of polysaccharide character, for example, water-absorbent, water-miscible or water-soluble natural or synthetic gums such as karaya, tragacanth, guar gum; algin; pectin; starches; proteins such as blood or egg albumin; and sponge (natural or synthetic).

The use of finely divided or flake water-absorbent substances as the intermediate layer has encountered some unforeseen difficulties. The discrete particles have shown a tendency to migrate in the multi-layer product causing certain areas to have reduced water or moisture absorption. This migration could take place during manufacture, shipment, storage as well as during actual commercial application. Obviously any possibility of reduced absorption during use is highly undesirable and could have a decided limiting effect on commercial utilization. An attempt to employ known adhesives to fix the discrete water-absorption particles in the intermediate layer was not completely satisfactory, since it was found that considerable surface area, in some instances as high as fifty percent, of the discrete particles was lost in terms of its water absorption function.

One object of the present invention is to provide an improved multi-layer product having as an intermediate layer moisture, water and/or blood absorption substances which avoids the aforementioned problems.

Another objection of this invention is to provide improved mono-layer or multi-layer products which are characterized by excellent water or moisture absorption as well as other characteristics which permits use without discomfort or abrasion.

A further object of this invention is to provide mono-layer or multi-layer products which are readily disposable such as by a toilet water stream.

A still further object of this invention is to provide a method of manufacturing the water-absorption substances employed in the mono-layer and multi-layer products.

These and other objects of the present invention will become readily apparent from the ensuing description.

In accordance with the present invention, it has now been found that the problem of migration of the discrete particles of the water-absorption substances and the possibility of the multi-layer disposable product having areas of reduced water or moisture absorption can be avoided by employing fibers or filaments of the water-absorbent substance. It has also been found possible to produce a novel absorbent product composed of such fibers or filaments. In preparing the absorbent material or layer the fibers of filaments can be employed in either woven or non-woven form. The water-absorption substances employed for this purpose can be selected from those described above, provided they form fibers. One of the preferred materials, however, is guar gum, which is the refined endosperm of guar seed separated from the seed germ and hull, a cold water-soluble polysaccharide consisting principally of a complex carbohydrate polymer of galactose and mannose, and correctly termed a galactomannan. Fibers or filaments made from other polysaccharide gums, pectin, starches and algin have also been found to be especially effective for the present purposes.

Conventional methods of manufacturing the fibers or filaments may be employed; and, in general, the fibers will have a thickness which may range from about one one-thousandth to about two or three one-hundredths of an inch. Nevertheless, it will be understood that the thickness of the fibers may vary over a wide range without deleteriously affecting the desirable characteristics of the products of this invention. In other words, any thickness may be utilized provided a high degree of water, moisture and blood absorption is maintained and provided that no discomfort or irritation is encountered during its use for the various purposes outlined above.

In accordance with one feature of this invention, a particularly effective method of preparing fibers of filaments from gums, and especially guar gum, has been discovered. More specifically, the fiber formation method comprises adding guar, for example, to an organic liquid such as a low molecular weight aliphatic alcohol to form a smooth slurry. In general, a ratio of about 1 to 10 of the guar or other gum to the organic solvent or liquid may be employed. One of the preferred organic compounds is isopropyl alcohol, although other organic compounds and especially the lower molecular weight alkanols may be utilized provided lump formation is avoided and a smooth slurry attained. This step can be carried out over a time period ranging from about 5 minutes to 8 hours. The resulting slurry is then added to excess water to precipitate a hydrate of the guar. The hydrate thus produced can then be directly extruded, utilizing conventional equipment, into a coagulating bath to form the desired fibers. The organic compound, liquid in form, useful as the coagulating material, is preferably a lower molecular weight alkanol such as isopropyl alcohol. As previously noted, fibers of varying thickness can be prepared and used in manufacturing the intermediate layer of the multi-ply product.

Fibers or filaments of the hydrated guar gum can also be prepared by adding the hydrated guar under slow agitation to a coagulating bath comprising the lower molecular weight alcohol, e.g. isopropyl alcohol, whereby the fibers are precipitated. In accordance with a preferred feature of this particular fiber forming method, the precipitated fibers are washed with additional alkanol and then dried. By utilizing such a step, it has been found that a somewhat softer fiber results, which can be a marked advantage in manufacturing the multi-ply product of this invention. It is important to employ agitation, but any breakdown or shearing of the fiber during precipitation should be avoided.

In accordance with still another feature of this invention, it has been found advantageous in some instances to employ chemically modified water-absorption fibers for preparing the aforedescribed products. For example, modified fibers of the above-described gums may be used. The polysaccharide gum fibers, e.g. guar, may be oxidized, acetylated, carboxylated, esterified, methylated, aminated, etherated, sulfated, phosphated and the like. Other possible modifications are the carboxyalkyl, cyanoalkyl ethers, hydroxyalkyl derivatives, etc. In some instances, it is also possible to utilize metal-containing derivatives of the water-absorption fibers such as calcium-modified guar and guar modified with calcium phosphate salts. Furthermore, linear or branched chain polymers may be grafted to the polysaccharides to provide modifications which can be useful to enhance absorption. It is also possible to modify the starting materials, such as the polysaccharide gums, prior to fiber formation. It will be understood, however, that any of the above modifications or the like are useful for present purposes provided that they do not deleteriously affect the fibers, water-absorption, ready disposability, etc.; properties which are essential to the present invention. In addition, any modification of the fibers which might cause irritation or have any harmful effect on the user of the multi-layer product has to be avoided. The modified water-absorption fibers must also be inert to the other layers of final products having multi-layers. Nevertheless, chemical modification of the fibers or starting material has been found to be advantageous in numerous instances. It has been found, for example, that chemically modified guar fibers apparently result in more rapid water, moisture and blood absorption without loss of gel structure.

As noted above, one of the products of the present invention comprises an absorbent product, which is readily disposable and which is made up solely of the woven or non-woven absorbent fibers or filaments. This mono-layer absorbent product may obviously vary widely in size.

The multi-ply product of this invention, on the other hand, will comprise a body-touching sheet or ply and a sheet or ply in addition to the water-absorption intermediate layer. The latter will now be described in detail for a more complete understanding of the present invention.

The body-touching ply is a thin, soft, absorbent cellulose-type sheet. It is advantageously made of a fine soft paper of a quality at least such as in a good grade of facial tissue. It is of such quality so that in the dry state it does not abrade or irritate the skin. It is beneficially relatively loosely textured, for example, as in a soft quality facial or toilet tissue, but yet of sufficient wet strength to retain its continuity and not tear while in the wet state on the wearer. This is desirable because, for example, it is not uncommon that when a diaper-wearing child only wets the diaper, the wet diaper is not replaced and the child continues to wear it and will wet it again one or more times.

So long as it has the required softness, the body-touching ply need not be restricted to a felted sheet, which is the preferred form; it may be a loose weave, for example, a fine grade gauze treated for softness. It can be made of cellulose, cotton, paper cotton, rayon, or even synthetic cellulose-like fiber, all of which and others like them are embraced by the expression "cellulose-type." In thickness, it can range from about one one-thousandth to about two one-hundredths or even about three one-hundredths of an inch.

The supporting ply likewise can be composed of a cellulose-type sheet such as used for the body-touching ply. However, the supporting sheet need not have the relatively open texture. It can be of fuller texture to provide somewhat greater strength, for it generally is the strongest of the three requisite component parts of the product. The supporting sheet may also be coated with a moisture resistant material on one or both sides, if desired.

Water-imperviousness is imparted to this sheet by application to one or both sides of it of a water-repellant coating that is inert or harmless to the skin of the wearer. Such coating can be of any suitable natural or synthetic wax, such as paraffin wax, and applied in known manner; or natural or synthetic resin, either rolled on or applied dissolved in a volatile solvent, or of lacquer.

However, whatever coating material is used should be applied preferably only in quantity sufficient to impart the water-imperviousness and should be one that leaves the coated sheet sufficiently flexible. While this supporting sheet can be as thin as the body-touching sheet, it desirably can be thicker. The water-impervious coating, when employed, is applied to prevent wetting, and particularly soiling, of any outer garment worn next to the napkin. Ordinarily, the coated side of this sheet can be the exposed surface of it in the assembled finished napkin.

That surface of the supporting sheet and also of the body-touching sheet that is not an exposed surface in the assembled finished napkin is conveniently referred to as the unexposed side of the supporting sheet or of the body-touching sheet respectively.

The water-absorption fibers can be employed in woven or in non-woven form, and the multi-ply products of this invention can be readily prepared by continuous manufacturing processes. For example, the body-touching sheet can be made available rolled up on a roller, and the supporting sheet can be similarly set up. These rolls can be mounted spaced apart from one another, e.g. one above the other, and arranged so that both of the sheets can be rolled off toward a common meeting point. If woven fibers are to be used as the intermediate layer, sheets formed therefrom can also be rolled up on a roller and fed to the common meeting point between the body-touching sheet and the supporting sheet to form the multi-ply product of this invention. If non-woven fibers are employed, they can be sprayed on to the unexposed surface of either of the two other sheets at any time prior to the common meeting point and the resulting combination passed to a set of rollers for the pressing operation. Alternatively, the non-woven fibers can be provided with its own separate cellulose-type sheet, a roll of which is so mounted that the sheet coming off it can be fed toward the common meeting point between the body-touching sheet and the supporting sheet feeding off their respective rolls. It should be understood, however, that the exact manner of manufacturing the multi-ply products, such as a napkin capable of being flushed away by a toilet stream, is not one of the essential features of this invention and that various known procedures for manufacturing multi-ply products can be utilized with equal effectiveness.

For the preparation of disposable diapers, the width of the sheets can be the same as the width of the diapers. These can be sold on rolls from which can be cut off any desired length, or they can be cut into selected lengths, for example, separated by suitable perforations or scoring. In the case of diapers or bed pads the product may be scored the entire width and length of the product for more simple disposition.

The edges of the two or three sheets pressed together can be sealed by any suitable innocuous adhesive or heatsealable polymer, either of which can be applied in known manner.

Bed pads to protect a bed surface against wetting can be prepared in substantially the same way as are the disposable diapers.

Catamenial pads can be prepared in relatively the same way by cutting them from sheets of suitable width, for example, a strip of any suitable width cut from a wide sheet, or may be stamped out by suitable dies from the sheets or wound around a core.

Tampons can be prepared, for example, by selecting sheets of suitable width or cutting such widths from wider sheets, and rolling the resulting strips into suitable tampon form; or by rolling any number of turns of the moisture-absorbent layer about a tampon core, to either of which these can be attached in any convenient known manner the strings for their removal after use.

The mono-layer multi-layer disposable products of the invention are not limited to the several herein described uses. The combination can be applied to other uses wherein their water absorbency serves effectively. Thus they can serve to absorb any other moisture, blood or aqueous exudation from any body opening, natural or otherwise, for example, as a bandage over any form of open wound.

The intermediate layer of the multi-ply product of this invention can also be provided with a minor amount of a suitable, capillary-penetrating agent or surfactant that is inert to the water-absorbent fibers or filaments, the fibers of the other sheets and harmless to the body in use. The capillary-penetrating agent may either be incorporated into the water absorption fibers or admixed therewith in particulated form.

While the products of the invention may be more generally embodied in a disposable diaper, their particular combination lends itself to their being embodied also as sanitary napkins, vaginal tampons or pads for protecting beds or cots or other surfaces against wetting by children who have not yet developed control of their elimination and voiding or by older people who during illness or otherwise have temporary or extended loss of such control. All of these various possible embodiments are intended by the expression "multi-layer, napkin capable of being flushed away by a toilet stream." Sometimes the expression "multi-ply" may be used in place of "multi-layer." The term "mono-layer" as used in the specification and claims shall mean products composed in whole or in part of the water-absorbent fibers.

Certain aspects of the present invention will be more fully understood by reference to the following illustrative embodiment.

*Example*

Approximately 5 grams of guar are added to 50 mls. of isopropyl alcohol to form a smooth slurry. The slurry is then poured into an excess of water to precipitate a guar hydrate over a 12 hour period. The resulting precipitate is then aded to about 1000 mls. of isopropyl alcohol to remove excess moisture and then rewashed in 500 mls. of isopropyl alcohol. The rewashed precipitate is next dried to produce water-absorbent fibers of guar.

While particular embodiments of this invention are shown above, it will be understood that the invention is obviously subject to variations and modifications without departing from its broader aspects. For example, the mono- and multi-layer products may be used for sundry purposes, and the water-absorption fibers may also be used with other materials, for example, in paper trays used for commercial packaging of frozen foods such as chickens, meat, fish, etc. as in paper and fabric wrapping of shipped products where high humidity may be a factor.

What is claimed is:

1. A readily disposable, water absorbent product comprised of fibers impressed into a separate supporting sheet capable of being flushed away by a toilet stream, said fibers being of an organic substance selected from the group consisting of blood albumin, egg albumin, starches, pectin, algin, karaya, tragacanth and guar gums, natural and synthetic gums of polysaccharide character, chemically modified starches, and chemically modified natural and synthetic gums of polysaccharide character, said fibers and said supporting sheet being united whereby the fibers are stationary with respect to the carrying sheet.

2. A product as set forth in claim 1 wherein said fibers are non-woven.

3. A multi-layer product capable of being flushed away by a toilet stream, such as a disposable diaper, bed napkin, catamenial device and devices for medical and surgical purposes, having as a body-touching layer a thin, soft, moisture-absorbent sheet and an outer layer, said body-touching layer and said outer layer being contiguously superposed, fibers being pressed into at least one of said layers on the side thereof contiguous with the other layer, said fibers being of an organic substance selected from the group consisting of blood albumin, egg albumin, starches, pectin, algin, karaya, tragacanth and guar gums, natural and synthetic gums of polysaccharide character, chemically modified starches, and chemically modified natural and synthetic gums of polysaccharide character, said fibers and said at least one layer being united whereby the fibers are stationary with respect to the layer.

4. A product as set forth in claim 3 wherein said fibers are non-woven.

5. A product as set forth in claim 4 wherein said non-woven fibers are pressed into each of said layers on the sides thereof disposed in mutual contiguity.

References Cited

UNITED STATES PATENTS

| | | | |
|---|---|---|---|
| 2,688,586 | 9/1954 | Eberl et al. | 26—209.6 |
| 3,070,095 | 12/1962 | Torr | 128—284 |
| 3,078,849 | 2/1963 | Morse | 128—290 |
| 3,114,672 | 12/1963 | Schott | 260—209.6 |

RICHARD A. GAUDET, *Primary Examiner.*

C. F. ROSENBAUM, *Examiner.*